May 18, 1965  M. A. STERN  3,184,721
WAVEFORM TIME COMPRESSION SYSTEM
Filed July 5, 1960  3 Sheets-Sheet 1

INVENTOR.
MARVIN A. STERN
BY George J. Seligsohn
ATTORNEY

3,184,721
WAVEFORM TIME COMPRESSION SYSTEM
Marvin A. Stern, Rochester, N.Y., assignor to General Dynamics Corporation, Rochester, N.Y., a corporation of Delaware
Filed July 5, 1960, Ser. No. 40,813
13 Claims. (Cl. 340—174)

This invention relates to a system for obtaining a time-compressed replica of the waveform of an applied input signal and, more particularly, to a system having no moving parts for reading information out of storage at a rate higher than that at which it was put into storage.

It is often desired to analyze the frequency spectrum of information in the form of a complex wave, such as speech information, for instance. Further, it is often desired to correlate such a complex wave with each of a large plurality of predetermined signals, each of which has a known frequency, amplitude and phase.

One well known way in which this may be accomplished is to record the complex wave, and then repeatedly play back the record. Each time the record is played back, the recorded complex wave may be analyzed for a different frequency component or may be correlated with a different one of the plurality of predetermined signals. It will be seen that since the complex waveform must be first recorded and then repeatedly played back, the complex wave cannot be analyzed or correlated, as the case may be, in real time, but that the time needed for accomplishing the analysis or correlation is substantially longer than the original duration of the complex wave. In spectrum analyzing or correlating a complex wave, such as speech, it would be particularly desirable to perform the spectrum analysis or correlation at the same rate as the speech is taking place, and substantially simultaneously therewith, i.e., in real time.

In order to accomplish such real time spectrum analysis or correlation, it is necessary to multiply the frequency components of the complex waveform, or more exactly to obtain time-compressed replicas of the complex waveform to be analyzed.

It is an object of the present invention to provide a system for obtaining such time-compressed replicas of a signal to be analyzed.

It is a further object of the present invention to provide a system for continuously storing information at a first rate and continuously reading out this stored information at a rate higher than that at which it was put into storage.

It is a further object of the present invention to provide such a system which utilizes no moving parts.

It is a further object of this invention to provide such a system utilizing as storage elements an array of transfluxors.

Figure 1:
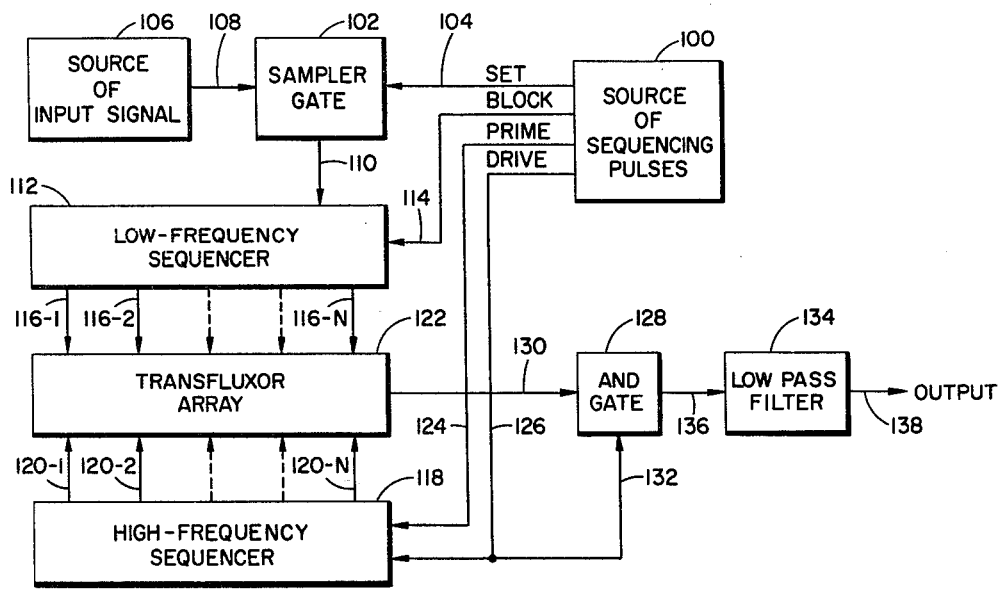
Figure 2:
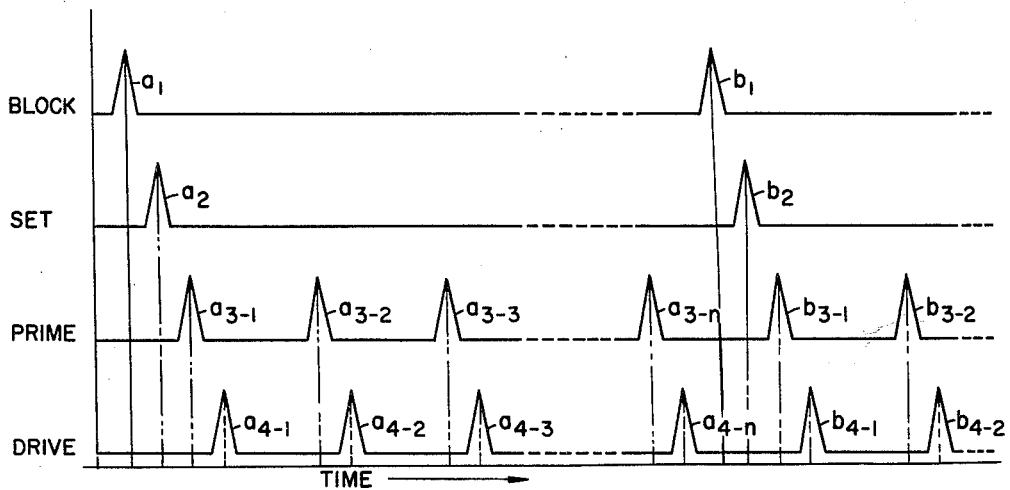
Figure 3:
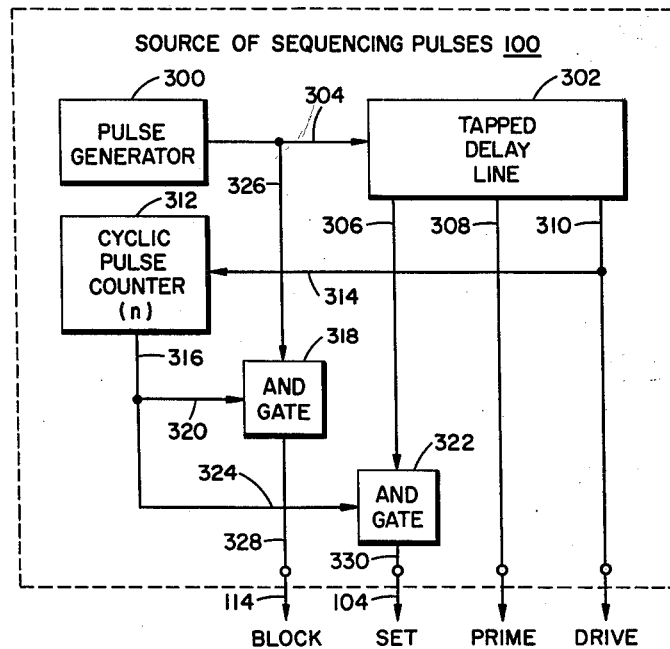
Figure 4:
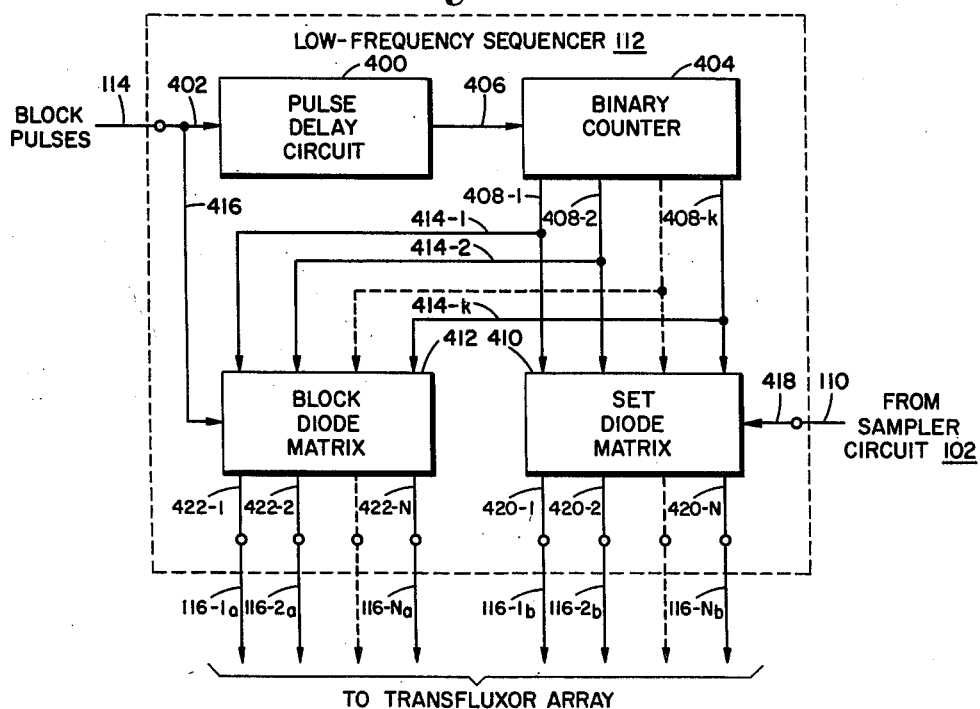
Figure 5:
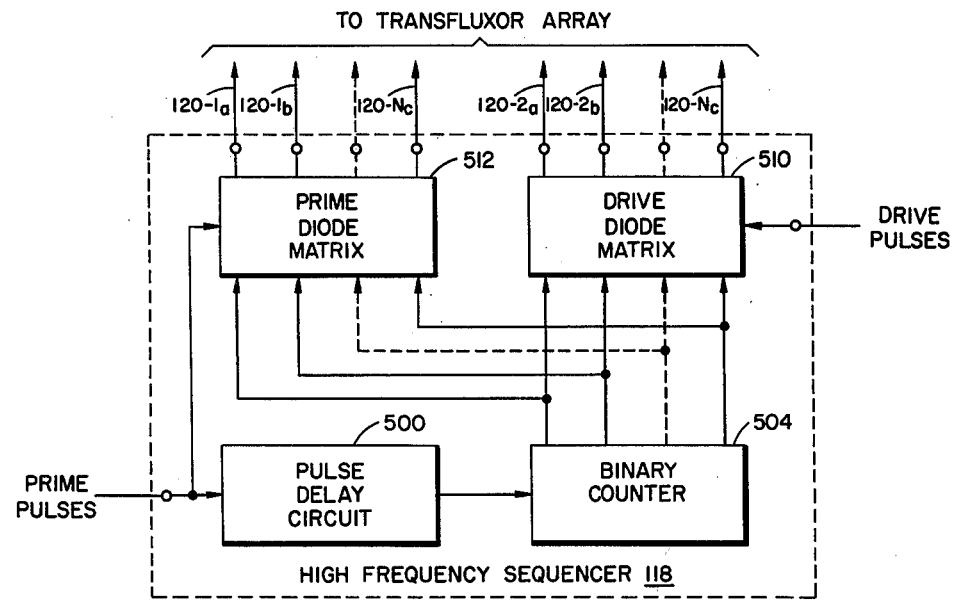
Figure 6:
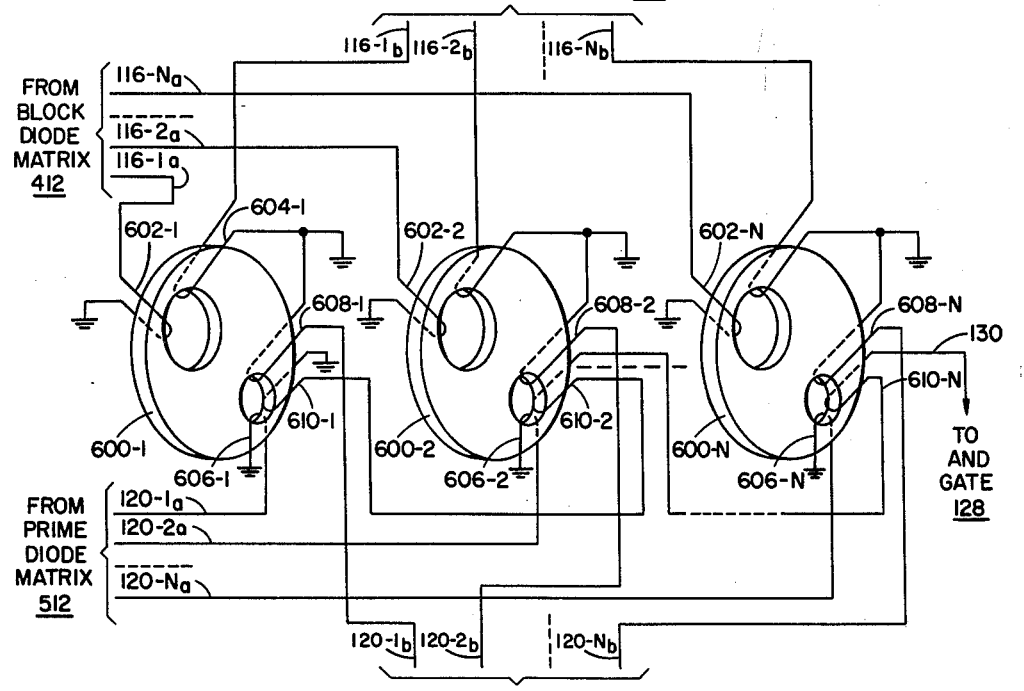

These and other objects, features and advantages of the present invention will become more apparent from the following detailed description taken together with the accompanying drawings, in which:

FIG. 1 is a block diagram of one embodiment of the present invention,

FIG. 2 is a timing diagram showing the relative timing of the sequencing pulses utilized in FIG. 1, FIG. 3 is a block diagram of one embodiment of the source of sequencing pulses shown in FIG. 1, FIG. 4 is a block diagram of one embodiment of the low-frequency sequencer shown in FIG. 1, FIG. 5 is a block diagram of one embodiment of the high-frequency sequencer shown in FIG. 1, and FIG. 6 is a schematic diagram of one embodiment of the transfluxor array shown in FIG. 1.

Referring to FIG. 1, there is shown source of sequencing pulses 100 for generating four separate and distinct series of pulses, designated, respectively, as set pulses, block pulses, prime pulses, and drive pulses.

Referring for a moment to FIG. 2, which shows the relative timing of these four series of pulses, it will be seen that the series of block pulses, such as pulses $a_1$ and $b_1$, and the series of set pulses, such as $a_2$ and $b_2$, occur at the same relatively low first given frequency. Also, the series of prime pulses, such as $a_{3-1} \ldots a_{3-n} \ldots b_{3-2}$, and the series of drive pulses, such as $a_{4-1} \ldots a_{4-n} \ldots b_{4-2}$, occur at the same relatively high second given frequency, which is equal to $n$ times the first given frequency. Therefore, $n$ prime and drive pulses, respectively, occur during the time interval between each two successive block and set pulses, respectively.

Furthermore, as shown in FIG. 2, a time delay, which is a fraction of a period of the second given frequency, exists between set pulse $\alpha_2$ and block pulse $\alpha_1$ and set pulse $b_2$ and block pulse $b_1$, respectively, between prime pulse $a_{3-1}$ and set pulse $a_2$ and prime pulse $b_{3-1}$ and set pulse $b_2$, respectively, and between drive pulse $a_{4-1}$ and prime pulse $a_{3-1}$ and drive pulse $b_{4-1}$ and prime pulse $b_{3-1}$, respectively. Therefore, as shown in FIG. 2, block pulse $a_1$ is next followed in time by set pulse $a_2$, which is next followed in time by prime pulse $a_{3-1}$, which is next followed in time by drive pulse $a_{4-1}$, which is next followed in time by prime pulse $a_{3-2}$, which is next followed in time by drive pulse $a_{4-2}$, etc., until prime pulse $a_{3-n}$ occurs, which is next followed in time by drive pulse $a_{4-n}$, which is next followed in time by the next succeeding block pulse $b_1$, after which the process is repeated for all the $b$ pulses.

Although there are many embodiments within the skill of the art which source of sequencing pulses 100 may take, one embodiment of source of sequencing pulses 100 is shown in FIG. 3.

As shown in FIG. 3, source of sequencing pulses 100 may consist of a pulse generator 300 for generating a series of periodic pulses at a relatively high frequency. The pulses from pulse generator 300 are applied to the input of a tapped delay line 302 over conductor 304. In response to each pulse applied to tapped delay line 302 over conductor 304, a pulse will appear on output conductor 306 from tapped delay line 302 after a first given time delay, on output conductor 308 from tapped delay line 302 after a second given time delay which is greater than the first given time delay, and on output conductor 310 from tapped delay line 302 after a third given time delay which is greater than the second given time delay. The pulses appearing on output conductor 308 represent the series of prime pulses and the pulses appearing on output conductor 310 represent the series of drive pulses.

The series of drive pulses appearing on output conductor 310 is applied as a pulse input to cyclic pulse counter 312 over conductor 314. Cyclic pulse counter 312 counts the number of pulses applied as an input thereto, recycling each time $n$ pulses have been counted. Cyclic pulse counter 312, only in response to registering a count of $n$ pulses, produces a potential marking on output conductor 316 thereof. As shown, output conductor 316 is connected, respectively, to a first input of AND gate 318 over conductor 320 and to a first input of AND gate 322 over conductor 324.

The pulses from pulse generator 300 are applied as a second input to AND gate 318 over conductor 326 and the pulses appearing on output conductor 306 are applied as a second input to AND gate 322.

Each of AND gates 318 and 322 will permit a pulse to pass therethrough only if a potential marking is present on output conductor 316. Therefore, only every $n$th pulse from pulse generator 300 will be passed through AND gate 318 to output conductor 328 thereof and only every *n*th pulse appearing on output conductor 306 will be passed by AND gate 322 to output conductor 330 thereof. The pulses appearing on output conductor 328 represent the series of block pulses and the pulses appearing on output conductor 330 represent the series of set pulses.

Returning now to FIG. 1, the series of set pulses from source of sequencing pulses 100 is applied, as shown, as a first input to sampler gate 102 over conductor 104. The signal emanating from source of input signal 106 is applied as a second input to sampler gate 102 over conductor 108.

Sampler gate 102, which is well known in the art, is a gate for passing the input present on conductor 108 to output conductor 110 thereof only in response to the presence of a set pulse on conductor 104. Therefore, the output present on output conductor 110 represents the instantaneous amplitude of the input signal on conductor 108 which exists at the time of occurrence of each set pulse. Output conductor 110 is connected, as shown, to a first input of low-frequency sequencer 112. Connected as a second input to low-frequency sequencer 112 is the series of block pulses present on conductor 114.

Low-frequency sequencer 112 is in effect a pulse-responsive commutator for applying the successive respective inputs applied thereto in sequence to each of output coupling means 116–1, 116–2 . . . 116–N, thereof.

One possible embodiment of low-frequency sequencer 112 is shown in FIG. 4. As shown in FIG. 4, the series of block pulses are applied as an input to pulse delay circuit 400 over conductor 402. The output from pulse delay circuit 400 is applied as an input to binary counter 404 over conductor 406. Pulse delay circuit 400 delays each block pulse applied thereto for a time interval which is greater than the interval between a block pulse and the next following set pulse. Binary counter 404 resets itself after counting *n* applied pulses. Emanating from binary counter 404 is a plurality of output conductors 408–1, 408–2 . . . 408–*k*, which are connected as inputs to set diode matrix 410.

As is well known in the art, binary counter 404 will produce a unique combination of potential markings of conductors 408–1 . . . 408–*k* which manifests the count registered therein.

The potential markings on output conductors 408–1 . . . 408–*k* are respectively applied as inputs to block diode matrix 412 over conductors 414–1 . . . 414–*k*.

The block pulses appearing on conductor 402 are also applied as an input to block diode matrix 412 over conductor 316, and the output pulse received from sampler circuit 102 is applied as an input to set diode matrix 410 over conductor 418. Set diode matrix 410, in accordance with the combination of potential markings on conductors 408–1 . . . 408–*k*, manifesting the count registered by binary counter 404, derives an output pulse on a particular one of output conductors 420–1 . . . 420–N thereof in response to the output pulse from sampler circuit 102. In a similar manner, block diode matrix 412 derives a pulse on a particular one of output conductors 422–1 . . . 422–N in response to a block pulse.

As shown, output conductor 422–1 is connected to conductor 116–1*a*, output conductor 422–2 is connected to conductor 116–2*a* . . . and output conductor 422–N is connected to conductor 116–N*a*. Similarly, conductor 420–1 is connected to conductor 116–1*b*, conductor 420–2 is connected to conductor 116–2*b* . . . and conductor 420–N is connected to 116–N*b*. Output coupling means 116–1 in FIG. 1 is composed of conductors 116–1*a* and 116–1*b*, output coupling means 116–2 in FIG. 1 is composed of conductors 116–2*a* and 116–2*b* . . . and output coupling means 116–N in FIG. 1 is composed of conductors 116–N*a* and 116–N*b*.

Returning to FIG. 1, high-frequency sequencer 118 has the series of prime pulses and drive pulses, respectively, applied as separate inputs thereto over conductors 124 and 126, respectively. High-frequency sequencer 118 applies each successive prime pulse and drive pulse, respectively, in sequence to output coupling means 120–1, 120–2 . . . 120–N thereof.

One embodiment of high-frequency sequencer 118 is shown in FIG. 5. High-frequency sequencer 118, which, as shown in FIG. 5, comprises pulse delay circuit 500, binary counter 504, drive diode matrix 510 and prime diode matrix 512, is identical to low-frequency sequencer 112, shown in FIG. 4, except that the prime pulses applied to pulse delay circuit 500 and prime diode matrix 512 in FIG. 5 replace the block pulses applied to pulse delay circuit 400 and block diode matrix 412 in FIG. 4. Furthermore, the drive pulses applied to drive diode matrix 510 in FIG. 5 replace the output pulses from sampler circuit 102 applied to set diode matrix 410 in FIG. 4.

Returning to FIG. 1, output coupling means 116–1 . . . 116–N and output coupling means 120–1 . . . 120–N are applied as inputs to transfluxor array 122. The output from transfluxor array 122 is applied as a first input to AND gate 128 over conductor 130.

Referring now to FIG. 6, there is shown one embodiment of transfluxor array 122. Transfluxor array 122 comprises N transfluxors consisting of transfluxors 600–1, 600–2 . . . 600–N, respectively. As shown, each of these transfluxors includes a large aperture and a small aperture. Linking the large aperture of each of transfluxors 600–1, 600–2 . . . 600–N, respectively, are coils 602–1, 602–2 . . . 602–N coupled to the corresponding one of conductors 116–1*a*, 116–2*a* . . . 116–N*a*, respectively, from block diode matrix 412. Also coupling the large aperture of each of transfluxors 600–1, 600–2 . . . 600–N are coils 604–1, 604–2 . . . 604–N coupled to the corresponding one of conductors 116–1*b*, 116–2*b* . . . 116–N*b*, respectively, from set diode matrix 410.

Linking the small aperture of each of transfluxors 600–1, 600–2 . . . 600–N are coils 606–1, 606–2 . . . 606–N coupled to the corresponding one of conductors 120–1*a*, 120–2*a* . . . 120–N*a*, respectively, from prime diode matrix 512. Also linking the small aperture of each of transfluxors 600–1, 600–2 . . . 600–N are coils 608–1, 608–2 . . . 608–N coupled to the corresponding one of conductors 120–1*b*, 120–2*b* . . . 120–N*b*, respectively, from drive diode matrix 510.

Further linking the small apertures of transfluxors 600–1, 600–2 . . . 600–N, respectively, are readout coils 610–1, 610–2 . . . 610–N, which are connected in series, are shown, and coupled to output conductor 130 extending to AND gate 128.

Returning now to FIG. 1, the series of drive pulses from source of sequencing pulses 100 is applied as a second input to AND gate 128 over conductor 132. The output from AND gate 128 is applied to lowpass filter 134 over conductor 136. The output from the system is obtained on output conductor 138 from lowpass filter 134.

Considering now the operation of the system, a transfluxor, which is a special type of magnetic core, may be switched completely from one state of magnetic saturation to an opposite state of magnetic saturation if the ampere turns linking the large aperture thereof are in the proper direction and have at least a predetermined value. If the ampere turns linking the large aperture of the transfluxor are of the proper direction, but are below this predetermined value, only the portion of the transfluxor in proximity to the large aperture will be switched from the aforesaid one state of magnetic saturation to the opposite state of magnetic saturation, and the portion of the transfluxor remote from the large aperture will not be switched but will remain in the aforesaid one condition of magnetic saturation. The smaller the value of the ampere turns, the smaller will be the portion which is switched and the larger will be the portion which is not switched, and conversely, the closer the value of the ampere turns approaches the aforesaid predetermined value, the larger will be the portion of the transfluxor which is switched and the smaller will be the portion of the transfluxor which is not switched.

Source of input signal 106 provides an output appearing on output conductor 108 consisting of the sum of a complex wave and a D.C. bias level which is greater than the maximum amplitude of the complex wave. Therefore, the total output always has the same polarity, that of the D.C. bias level, but varies in amplitude in accordance with the complex wave.

It will, therefore, be seen that the output from sampler gate 102 consists of output pulses of a given polarity which occur in coincidence with the set pulses from source of sequencing pulses 100, and which have an amplitude determined by the instantaneous amplitude of the complex wave at the time of sampling.

The application of a block pulse to a transfluxor provides a value of ampere turns exceeding the aforesaid predetermined value, so that the transfluxor is completely saturated in a given state of magnetic saturation, thereby erasing any information previously stored in the transfluxor.

The application of an output pulse from sampler gate 102 to a transfluxor provides ampere turns in a direction tending to switch the transfluxor from the aforesaid given state of magnetic saturation to the opposite state of magnetic saturation. However, the value of the ampere turns provided by the output pulse emanating from the sampler gate, which is proportional to the instantaneous amplitude of a complex wave, never exceeds the aforesaid predetermined value. Therefore, only a portion of the transfluxor, the extent of which is proportional to the instantaneous value of the complex wave, is actually switched to the opposite state of saturation.

As shown in FIG. 6, prime and drive pulses, respectively, are amplied to separate coils, such as coil 606–1 and coil 608–1 of transfluxor 600–1, both of which are associated with the small aperture of a transfluxor. In response to the application of a prime pulse, a relatively small given value of ampere turns links the small aperture of the transfluxor. The direction of these ampere turns, responsive to the application of a prime pulse, is such as to tend to switch the transfluxor with which it is associated back from its opposite state of magnetic saturation to the aforesaid one state of magnetic saturation.

The ampere turns responsive to an applied drive pulse is also equal to this relatively small given value. However, the direction of the ampere turns responsive to an applied drive pulse is such as to tend to switch the transfluxor from the aforesaid one value of magnetic saturation to its opposite state of magnetic saturation.

Since the given value of ampere turns associated with the prime pulse and drive pulse, respectively, is relatively small, they can only affect the magnetic saturation of the transfluxor in the immediate vicinity of the small aperture.

Thus, it will be seen that the net effect of the application of a prime pulse and the application of the following drive pulse is zero.

However, in response to the application of the prime pulse, an output pulse of a given polarity will be induced in the readout coil, such as coil 610–1 of transfluxor 600–1, linking the small aperture. Also, an output pulse of a polarity opposite to a given polarity will be induced in the readout coil following an applied drive pulse.

From the foregoing discussion, it will be seen that the amplitude of these respective output pulses induced in the readout coil of the transfluxor depends upon the extent of the portion of transfluxor 600–1 actually switched from one state of magnetic saturation to the other by the applied prime and drive pulses, respectively. This, in turn, will depend upon the amplitude of the previously applied output pulse from the sampler gate, since, as previously discussed, the extent of the portion of a transfluxor which has been switched to its opposite state of magnetic saturation is proportional to the amplitude of the applied output pulse from the sampler gate.

Thus, although the output pulses induced in the readout coil in response to a prime pulse and the following drive pulse, respectively, are of opposite polarity, the amplitude of each of these output pulses is proportional to the amplitude of the previously applied output pulse from the sampler gate, i.e., to the instantaneous amplitude of the complex wave at the time of sampling.

It will be seen that low-frequency sequencer 112 operates cyclically to apply each successive block pulse and each successive output pulse from sampler gate 102, respectively, to the respective ones of the N transfluxors of transfluxor array 122 in sequence at a given low freqency. Also, high-frequency sequencer 118 operates cyclically to apply each successive drive pulse, respectively, to the respective ones of the N transfluxors of transfluxor array 122 in sequence at a high frequency which is equal to $n$ times the given low frequency.

Since, as shown in FIG. 6, the readout coils, such as readout coil 610–1, 610–2 . . . 610–N, are connected in series, a pulse will appear on output conductor 130 in response to each prime pulse and to each drive pulse. However, due to the presence of AND gate 128, which is gated on only during the presence of a drive pulse, only the output pulses on output conductor 130 occurring in response to drive pulses will be passed through to conductor 136. These passed output pulses are applied to lowpass filter 134, which smooths the pulses to provide a continuous output which varies in amplitude in accordance with the relative amplitudes of successive pulses applied as an input thereto.

It might be pointed out here that AND gate 128 could be gated with the prime pulses, rather than the drive pulses, as shown, since the output pulses on output conductor 130 responsive to the prime pulses contains the same information as the output pulses on output conductor 130 responsive to the drive pulses.

From the foregoing discussion, it will be seen that the exact manner in which the system shown in FIG. 1 operates is determined by the relative values of N, the number of transfluxors in transfluxor array 122, and $n$, the ratio between the rate at which information is read out of transfluxor array 122 and the rate at which information is stored in transfluxor array 122.

If $n$ equals N, it will be seen that low-frequency sequencer 112 will read in one piece of information for each complete cycle of operation of high-frequency sequencer 118. Due to the difference in phase between the time of occurrence of the block and set pulses, on the one hand, and the prime and drive pulses, on the other hand, shown in FIG. 2, when N equals $n$, information will be read in to one of the transfluxors during the interval between the end of one cycle of operation of high-frequency sequencer 118 and the beginning of the next cycle of operation of high-frequency sequencer 118.

For illustrative purposes, in order to clarify the above statement, assume that both N and $n$ equal 10, that information 1 is stored in the first transfluxor, information 2 is stored in the second transfluxor . . . and information 10 is stored in the tenth transfluxor, and that a readout cycle is just beginning. Then, on this readout cycle, information 1, 2, 3, 4, 5, 6, 7, 8, 9, and 10 will be read out. At the termination of this readout cycle and before the beginning of the next readout cycle, information 1 will be erased by a block pulse applied thereto and new information 11 will be read in to transfluxor 1. Therefore, on the next readout cycle, information 11, 2, 3, 4, 5, 6, 7, 8, 9, and 10 will be read out, and on the next readout cycle, information 11, 12, 3, 4, 5, 6, 7, 8, 9, and 10 will be read out, etc.

Thus, it will be seen that on each succeeding readout cycle, if N equals $n$, nine out of the ten stored pieces of information will be the same, but that one piece of new information will be entered at the expense of the earliest occurring piece of old information.

If N is equal to $2n$ on each succeeding readout cycle, eight out of the ten pieces of information will be the same, but two new pieces of information will be added at the expense of the two earliest occurring pieces of information. Thus, on a first readout cycle, if N equals $2n$, the stored information is 1, 2, 3, 4, 5, 6, 7, 8, 9, 10. Then on the next readout cycle the information will be 11, 12, 3, 4, 5, 6, 7, 8, 9, 10, and on the next readout cycle it will be 11, 12, 13, 14, 5, 6, 7, 8, 9, 10, etc. However, here also each readout cycle differs from the previous readout cycle by a fixed number of pieces of new information. Generalizing, each readout cycle will differ from the preceding readout cycle by the same fixed number of new pieces of information so long as N, the number of transfluxors in transfluxor array 122, is an integral harmonic of $n$, the ratio of the rate of read out to the rate of read in.

If N equals $n-1$, high-frequency sequencer 118 will operate through one complete readout cycle and then read out one transfluxor on its next cycle before the next piece of information is read in. In this case, nine of the ten pieces of information will again be the same on succeeding readout cycles, but one new piece of information will be added at the expense of the earliest occurring piece of old information.

For illustrative purposes, to clarify the above statement, assume that N is 10 and that $n$ is 11, and that in the interval between the end of one readout cycle and the beginning of the next readout cycle, the first piece of information has been erased from the first transfluxor by a block pulse and the eleventh piece of information has been stored in the first transfluxor in response to the following set pulse. Then on this readout cycle which is beginning, the information read out will be 11, 2, 3, 4, 5, 6, 7, 8, 9, and 10. High-frequency sequencer 118 will then begin its next readout cycle, again reading out information 11 from the first transfluxor. However, since N equals 10 and $n$ equals 11, just after the first transfluxor of transfluxor array 122 has been read out and just before the second transfluxor of transfluxor array 122 is read out, the second piece of information stored in the second transfluxor will be erased and the twelfth piece of information will be substituted therefor. Therefore, on this next readout cycle, the information read out will be 11, 12, 3, 4, 5, 6, 7, 8, 9, and 10. On the next occurring readout cycle, the eleventh and twelfth pieces of information will again be read out, but in the interval between the reading out of the second transfluxor and the third transfluxor, the thirteenth piece of information will be read in to the third transfluxor. Therefore, on this readout cycle, the information read out will be 11, 12, 13, 4, 5, 6, 7, 8, 9, and 10.

Thus, it will be seen that if N equals $n-1$, each readout cycle differs from the previously read out cycle by one new piece of information, which is substituted for the earliest old piece of information.

If N is equal to $2(n-1)$, each readout cycle will be identical to the previous readout cycle except for two new pieces of information which will have been substituted for the two earliest old pieces of information. Thus, if on one readout cycle, the information read out is 11, 2, 3, 4, 5, 6, 7, 8, 9, 10, on the next readout cycle the information read out will be 11, 12, 13, 4, 5, 6, 7, 8, 9, 10, and on the next readout cycle the information read out will be 11, 12, 13, 14, 15, 6, 7, 8, 9, and 10.

Generalizing, as long as N is some integral harmonic of $n-1$ each readout cycle will differ from the preceding readout cycle by a fixed number of pieces of information.

However, should $N < n-1$, it will be seen that some successive readout cycles will be completely identical to each other, while in other successive readout cycles the latter-occurring readout cycle will differ from the earlier occurring readout cycle by one piece of information. Thus, in this case, succeeding readout cycles will not always differ from each other by a fixed number of new pieces of information.

Also, if $N > n$, but is not equal to an integral harmonic of $n$, it will be seen that some successive readout cycles will differ from each other by a given number of pieces of new information, while successive cycles will differ from each other by a number of pieces of new information one greater than this given number of pieces of information. Thus, in this case, too, succeeding cycles will not always differ from each other by a fixed number of new pieces of information.

If the disclosed system is being utilized in a frequency spectrum analyzer, it makes no difference whether or not successive readout cycles differ from each other by a fixed number of pieces of information. However, if the disclosed system is being utilized for correlation, it is essential that successive readout cycles differ from each other by a fixed number of pieces of information. Therefore, in the case where the disclosed system is to be utilized for correlation, N must be equal to $n$ or an integral harmonic thereof, or N must be equal to $n-1$ or an integral harmonic thereof.

From the foregoing discussion, it will be seen that the output from lowpass filter 134 obtained on output conductor 138 on successive readout cycles of sequencer 118 will be time-compressed replicas of partially overlapping portions of the complex waveform of the input signal from source of input signal 106. Therefore, each of the frequency components and the relative phase and amplitude thereof of the output obtained on output conductor 138 bears a one-to-one correspondence with each corresponding frequency and relative phase and amplitude thereof of the complex waveform of the input signal from source of input signal 106, but is in effect frequency multiplied by a factor $n$.

It is, therefore, possible to utilize the disclosed system in apparatus for analyzing the frequency spectrum of a continuous complex wave in real time, or in apparatus for obtaining the correlation between the complex wave and predetermined signals of known frequency, phase and amplitude, in real time.

Although only a preferred embodiment of the invention has been described and shown herein, it is not intended that the invention be restricted thereto, but that it be limited only by the true spirit and scope of the appended claims.

What is claimed is:

1. A waveform time compression system comprising an array of N individual data storage means, where N is a first given integer, sampling means for sampling at a first given rate the instantaneous amplitude of an applied input analog continuous wave signal for producing successive samples each of which has an amplitude corresponding to the instantaneous amplitude of said applied input analog continuous wave signal, low-frequency cyclically-operated sequencing means coupled to said sampling means and to said array for applying sequentially at said first given rate successive samples to each of said individual data storage means, respectively, to effect the storage of the amplitude information contained therein, and means including high-frequency cyclically-operated sequencing means coupled to said array and operating in the interval between each pair of successive samples for non-destructively reading out sequentially at a second given rate the information stored in each of said individual data storage means, respectively, said second given rate being $n$ times said first given rate, where $n$ is a second given integer greater than unity.

2. The system defined in claim 1, wherein N equals $n$.

3. The system defined in claim 1, wherein N equals $(n-1)$.

4. The system defined in claim 1, wherein N equals an integral harmonic of $n$.

5. The system defined in claim 1, wherein N equals an integral harmonic of $(n-1)$.

6. The system defined in claim 1, wherein each of said individual data storage means, respectively, is an individual transfluxor.

7. A waveform time compression system comprising an array of N individual transfluxors, where N is a first given integer, output means in cooperative relationship with said transfluxors, a source of input wave signal, a source of sequencing pulses for producing as respective first, second, third, and fourth outputs therefrom periodic block, set, prime, and drive pulses, respectively, said block and set pulses, respectively, occurring at a first frequency, said prime and drive pulses, respectively, occurring at a second frequency equal to $n$ times said first frequency, where $n$ is a second given integer, said block, set, prime, and drive pulses being phased with respect to each other to provide following each $n$th drive pulse a block pulse followed by a set pulse followed by a prime pulse followed by the $(n+1)$th drive pulse, a sampling gate coupled to said source of input wave signal and to said source of sequencing pulses for producing an output therefrom in response to each set pulse having an amplitude proportional to the instantaneous amplitude of said input wave signal at the time of occurrence of each set pulse, a low-frequency cyclically-operated sequencer coupled to said sampling gate, said source of sequencing pulses and to said array of transfluxors for applying in sequence each block pulse in cooperative relationship with each individual transfluxor, respectively, to erase any formation previously stored therein and for applying in sequence each output from said sampling gate in cooperative relationship with each individual transfluxor, respectively, to store therein the information contained in that output from said sampling gate, a high-frequency cyclically-operated sequencer coupled to said source of sequencing pulses and to said array of transfluxors for applying in sequence each prime and each drive pulse, respectively, in cooperative relationship with each individual transfluxor, respectively, to control the non-destructive readout of the information stored therein and to effect in response thereto the inducing in said output means of an output signal containing the information stored therein.

8. The system defined in claim 7, wherein said output means is serially coupled to all said transfluxors, and said output means includes an AND gate coupled to said source of sequencing pulses for passing said output signal only during the presence of a drive pulse.

9. The system defined in claim 7, wherein said output means is serially coupled to all said transfluxors, and said output means includes an AND gate coupled to said source of sequencing pulses for passing said output signal only during the presence of a prime pulse.

10. The system defined in claim 7, wherein N equals $n$.

11. The system defined in claim 7, wherein N equals $(n-1)$.

12. The system defined in claim 7, wherein N equals an integral harmonic of $n$.

13. The system defined in claim 7, wherein N equals an integral harmonic of $(n-1)$.

References Cited by the Examiner

UNITED STATES PATENTS

| 2,849,704 | 8/58 | Neff | 340—172.5 |
| 2,889,542 | 6/59 | Goldner et al. | 340—174 |
| 2,896,193 | 7/59 | Herrmann | 340—174 |

IRVING L. SRAGOW, *Primary Examiner.*